US 7,707,705 B2

(12) United States Patent
Pleugel et al.

(10) Patent No.: US 7,707,705 B2
(45) Date of Patent: May 4, 2010

(54) HIGH-SPEED MILLING CUTTER SYSTEM AND METHOD FOR PRODUCING METALLIC GUIDE ELEMENTS

(75) Inventors: Lothar Pleugel, Iserlohn (DE); Ingo Strege, Iserlohn (DE); Olaf Frigge, Dortmund (DE); Dietmar Bretzke, Schwerte (DE)

(73) Assignee: Hoesch Schwerter Profile GmbH, Schwerte (DE)

( * ) Notice: Subject to any disclaimer, the term of this patent is extended or adjusted under 35 U.S.C. 154(b) by 0 days.

(21) Appl. No.: 11/720,197

(22) PCT Filed: Nov. 25, 2005

(86) PCT No.: PCT/EP2005/012609

§ 371 (c)(1),
(2), (4) Date: Oct. 3, 2007

(87) PCT Pub. No.: WO2006/056456

PCT Pub. Date: Jun. 1, 2006

(65) Prior Publication Data

US 2008/0145165 A1 Jun. 19, 2008

(30) Foreign Application Priority Data

Nov. 29, 2004 (DE) .................. 10 2004 057 655
Apr. 20, 2005 (DE) .................. 10 2005 018 549

(51) Int. Cl.
*B23P 23/00* (2006.01)
*B23C 1/00* (2006.01)

(52) U.S. Cl. ............... 29/527.6; 29/33 C; 29/563; 409/132; 409/159; 409/172; 409/213; 409/201; 409/174

(58) Field of Classification Search ............... 29/33 C, 29/563, 33 P, 557–558, 527.1, 527.5, 527.6; 414/758; 409/159, 161, 172–173, 192, 203, 409/213, 217, 201, 211, 216, 131, 132, 164, 409/174

See application file for complete search history.

(56) References Cited

U.S. PATENT DOCUMENTS 3,701,187 A * 10/1972 Erkfritz .................. 407/46
3,729,808 A * 5/1973 Wolf et al. ............... 407/44
3,842,989 A * 10/1974 Nakamura ............... 414/758

(Continued)

FOREIGN PATENT DOCUMENTS

DE 2228991 B1 9/1973

(Continued)

*Primary Examiner*—Erica E Cadugan
(74) *Attorney, Agent, or Firm*—Gudrun E. Huckett

(57) ABSTRACT

Metallic guide elements having a functional area are made from profiled blanks by hot forming the profiled blanks and subsequently milling in a high speed milling cutter system the profiled blanks by a position-controlled milling cutter head with milling disks of a great diameter, wherein in the step of hot forming the profiled blanks are matched with regard to a cross-sectional mass distribution of the profiled blanks, respectively, to the subsequent step of milling such that by a partial cutting removal in the areas of the profiled blanks that become the functional area of the guide element narrow dimensional tolerances are produced. The material flow of the profiled blanks within the high-speed milling cutter system is controlled autonomously by an integrated stacking device that has manipulators and turning stations.

13 Claims, 10 Drawing Sheets

U.S. PATENT DOCUMENTS

| | | | |
|---|---|---|---|
| 4,796,341 A | 1/1989 | Kuhn, II et al. | |
| 5,393,174 A * | 2/1995 | Wawrzyniak | 407/51 |
| 5,996,329 A * | 12/1999 | Cardenas | 29/48.5 R |
| 6,164,351 A | 12/2000 | Weathers et al. | |
| 6,319,104 B1 | 11/2001 | Emter | |

FOREIGN PATENT DOCUMENTS

| | | |
|---|---|---|
| DE | 269631 A1 | 7/1989 |
| DE | 3908562 A1 | 2/1990 |
| DE | 4111596 A1 | 10/1992 |
| DE | 19621536 C2 | 12/1997 |
| DE | 10140307 C1 | 3/2003 |
| EP | 0572846 A | 12/1993 |
| EP | 1284170 A | 2/2003 |

* cited by examiner

HIGH-SPEED MILLING CUTTER SYSTEM AND METHOD FOR PRODUCING METALLIC GUIDE ELEMENTS

BACKGROUND OF THE INVENTION

The invention relates to a high-speed milling cutter system for producing metallic guide elements by combining hot forming with subsequent machining by cutting wherein in the step of hot forming a profiled section blank, matched with regard to its cross-sectional mass distribution to the step of machining by cutting, is produced such that narrow dimensional tolerances are generated by partial cutting removal in the functional area of the guide elements.

The invention also concerns a method for producing the aforementioned metallic guide elements.

Such a device or method is disclosed in German patent 196 21 536 C2. In methods and devices for producing profiled steel rods for linear guide elements by means of a combination of hot forming and subsequent cold forming, a forming step done by cutting is provided between the manufacturing stages of hot forming and cold forming. In this way, cost-intensive and time-consuming production steps are avoided.

In the case of far-reaching forklift mast systems (great lifting travel), the essentially U-shaped or H-shaped guide elements used for forklift construction are subjected, in accordance with the prior art, to a cold drawing operation after hot forming in order to narrow the dimensional chamber tolerances (functional area). In this way, the corresponding tolerances can be approximately cut in half. However, this method is not optimal in regard to business-economical and value-analytical considerations and leads to high production costs. Moreover, it has been attempted to confine the chamber dimensions by means of conventional milling technologies. This manufacturing technology however has not found acceptance in mass production because of cost and performance considerations.

Cold drawing is however not economical for this task and leads to high production costs. Moreover, it has been attempted to confine the chamber dimensions by means of conventional milling technology. This manufacturing technology however has not found acceptance in mass production because of cost and performance considerations.

SUMMARY OF THE INVENTION

It is therefore an object of the invention to propose a high-speed milling cutter system and a method with which metallic guide elements, primarily for the forklift industry, can be made available in order to achieve a process course that increases throughput and to achieve a reduction of the non-productive processing time in comparison to conventional milling technology.

This object is solved with regard to high-speed milling cutter systems in that the high-speed milling cutter system has a position-controlled milling cutter head with milling disks of a great diameter and has a modular configuration, wherein a stacking device is integrated that is comprised of autonomously working manipulators and turning stations.

This object is solved in regard to the method in that a milling operation is carried out by means of a position-controlled milling cutter head with milling disks of a great diameter and material flow is realized autonomously within a high-speed milling cutter system of a modular design by means of an integrated stacking device comprised of manipulators and turning stations.

The high-speed milling cutter system according to the invention comprises an integrated stacking device for profiled sections having lengths of several meters. The high-speed milling cutter system of modular design removes in a targeted fashion layers that are to be decarburized of rolled profiled rods and reduces in a defined way their dimensional tolerances of the chamber. The stacking device enables an autonomous material flow within the high-speed milling cutter system so that the use of external time-consuming manipulation devices is no longer required.

Moreover, it enables a seamless and system-conform integration of the high-speed milling cutter system into the existing total in-plant material flow system that can be outlined as follows: In accordance with the prior art, the profiled rods produced in-plant are combined to profiled rod bundles wherein the profiled rods within a profiled rod bundle are arranged in geometrically predetermined sequence and position relative to one another, in accordance with a so-called stacking pattern.

The stacked profiled rod bundles are the basis of an optimized in-plant and out-plant material flow. The integrated automated stacking device ensures the connection to this material flow without this requiring additional manipulation expenditure.

The rolled profiled rods that are supplied to the high-speed milling operation and are preferably combined to stacked profiled rod bundles in quantities that are conventional for the in-plant operation are positioned for processing in the area of the material feed of the high-speed milling cutter system.

For avoiding additional manipulation expenditure, the profiled rod bundles are removed rod by rod from the stack by means of a manipulator at the feed side. The manipulator is part of an integrated stacking device comprised of two manipulators and two turning stations of the high-speed milling cutter system. The stacking device serves for removing, stacking, turning, transporting, and positioning the profiled rods.

The manipulator conveys the profiled rod either directly or indirectly into the milling plane. The direct feed is done when the geometric profiled rod positioning in the profiled rod bundle is identical to that in the milling plane. The indirect rod feed is required when the profiled rod must first be rotated by 180 degrees about its longitudinal axis because its stacking position deviates by exactly 180 degrees from the fixed milling position. The turning function is carried out by the turning station at the feed side. After milling, the profiled rods are removed by means of a manipulator provided at the exit side from the milling plane and stacked to profiled rod bundles. In this connection, this stacking pattern corresponds to that of the profiled rod bundle at the feed side. Since realizing the desired stacking pattern requires a rotation of the corresponding profiled sections by 180 degrees about their longitudinal axis before being placed into the profiled rod bundle that is produced at the exit side, a turning station for performing this function is installed at the exit side.

The U-shaped profiled rods, because of their cross-sectional shape, have only a single chamber so that only one milling operation with corresponding manipulators is required. The H-shaped profiled rods, on the other hand, have two chambers and must therefore pass through two milling operations with the accompanying manipulations.

As disclosed, the stacking device that, in accordance with the gist of the invention, is provided with two manipulators and two correlated turning stations solves this manipulation task by a coordinated use of the elements of the stacking device in accordance with the principle of minimized non-productive processing time.

Preferably, the turning station at the exit side is provided, in addition to the horizontal turning axis, also with a vertical turning axis in order to be able to process asymmetrical H-shape profiled sections in a single pass. Accordingly, it is in principle ensured that the stacked profiled rod bundle supplied as a rolled profiled section to the horizontal milling cutter system, after completion of milling, can be removed as a stacked finish-milled profiled rod bundle inexpensively in the exit area.

Processing by milling of the profiled rods is carried out in the milling plane of the high-speed milling cutter system. During the milling operation the profiled rod is stationary within a profiled rod clamping device in such a way that the profiled chamber faces upwardly in the direction toward the milling cutter head. By means of a milling disk system acting in at least two vertical planes, the entire length of the profiled rod is acted on in a single pass and is thus machined by cutting.

By means of appropriate monitoring members it is ensured that the profiled rods are introduced in a correct position, i.e., with upwardly facing profiled chamber, into the clamping device by means of the manipulators.

The profiled rods are clamped by means of adjustable clamping elements horizontally against a positionable fixed stop. In coordination with the horizontal clamping action, vertically arranged clamping elements are effective as holding-down elements in order to press the profiled rods without play against the straight profiled rod support of the clamping device.

In this way, possibly existing linear and torsional deviations of the profiled rods have no negative effect on the milling result.

Moreover, the horizontal clamping elements are designed such that profile deformations changing the chamber dimensions are prevented. The horizontal and vertical clamping elements are adjustable to various cross-sections of the profiled rods.

The effective length of the clamping device can be occupied by a single profiled rod having a corresponding length or by a combination of profiled rods of identical or different length. The latter are fed into the feeding area of the high-speed milling cutter system from different stacked bundles. Monitoring sensors avoid length collisions in this connection.

The milling cutter head that is comprised of several elements is adjustable in a defined way with regard to its machine-technological adjusting axes relative to the geometric center of the profiled chamber dimensions and with regard to the depth of the dimensional area of the chamber in order to achieve the desired profile dimensions after milling. For this purpose, the profile-specific actual sizes before milling and during the milling process are detected by mechanical or optoelectronic measuring sensors. By means of appropriate processing of the measured values, those adjusting parameters can be generated that will precisely position the milling cutter head by means of actuating elements.

The milling area is preferably configured to have an adjustable milling cutter head that is positioned on a driven shaft and is provided with cutting members arranged in at least two separate planes.

In addition, a variant can be employed in which two "half" milling cutter heads, mounted on a correlated driven shaft, respectively, are positioned so as to be displaced relative to one another. They supplement one another with their partial functions to the function of the complete milling cutter head and have the advantage that the clearly separated planes provided with the cutting members can be adjusted to the desired dimensions with minimal expenditure.

In an advantageous manner the milling area is provided with a deburring and post-shaping device that is connected fixedly to the milling cutter head unit as a follower. The device has the task to remove in a defined way possibly existing burrs at the transition between the machined inner flange area and the unmachined horizontal flange width area and to generate a predetermined transitional contour between the two surfaces. This device is embodied by means of driven milling cutters that are appropriately matched with regard to their diameter and their shape.

For a further improvement in performance, the high-speed milling cutter system can be provided with a second milling plane that is arranged parallel to the existing one at a minimal spacing thereto. For this purpose, the milling cutter head carriage is designed to be rotatable about its vertical axis by 180 degrees. In this way, the milling cutter head can travel across the milling plane in one direction and can travel across the second milling plane in the opposite direction. This embodiment is not shown in the drawings.

Because of the modular configuration of the high-speed milling cutter system the processing time relative to conventional milling technology can be shortened. The method according to the invention enables in particular by selection of milling disks of greater diameters a higher advancing speed. Advancing speeds of up to 10 m per minute are possible.

In particular, the mass distribution in the dimensional area of the chamber acting as the functional area is designed such that after machining by cutting it is ensured that this area is free of decarburization.

In an advantageous manner the mass distribution in the dimensional area of the chamber is designed such that after machining by cutting a defined thickness of the profile flanges is achieved simultaneously.

A further improvement of the properties of the rolled profiled section that has been machined by cutting is achieved by a device for surface hardening the running surfaces, which device is arranged downstream.

BRIEF DESCRIPTION OF THE DRAWINGS

Further functions, functional features, details, and advantages of the proposed invention will be explained in more detail with the aid of the embodiments illustrated in the drawings.

The drawings show in.

DESCRIPTION OF PREFERRED EMBODIMENTS

Figure 1:
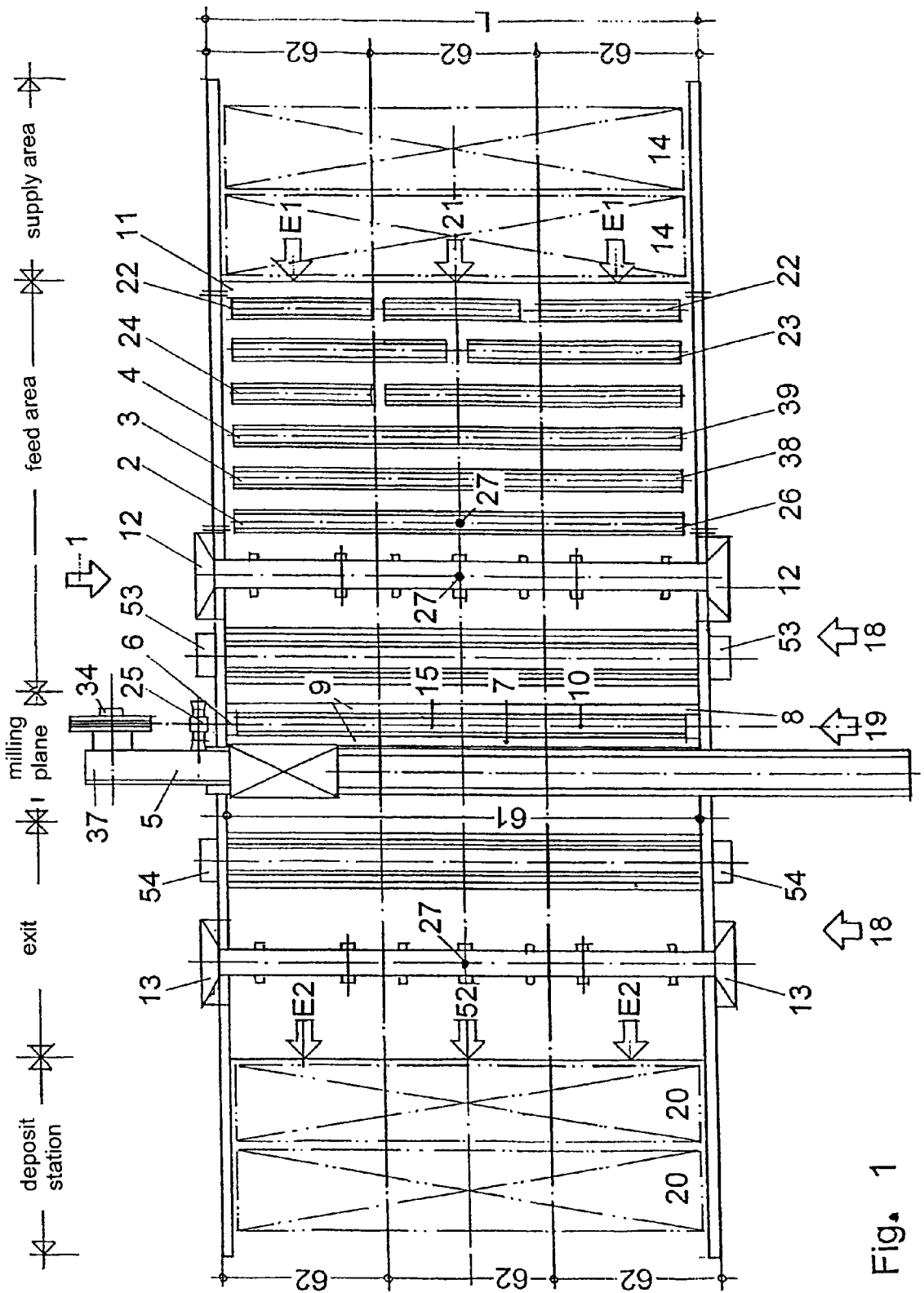
FIG. 1 a plan view onto the basic configuration of the high-speed milling cutter system with integrated stacking device, with manipulators and turning stations.

According to FIG. 1, the high-speed milling cutter system with integrated stacking device 1 is comprised essentially of identical machine modules 62 that, when added in the longitudinal direction, approximately provide the device length L. The length L can be matched to the total length of the profiled sections 2, 3, 4 or profiled section combinations 22, 23, 24.

The in-plant stacked profiled rod bundles are fed into the material supply area 14 for processing. The feed-side manipulator 12 that is part of a stacking device 18 removes with the aid of sensors the profiled rods rod by rod from the bundle or the bundles and transports them in the feeding direction 21 of the profiled sections toward the milling plane 15. When the profiled rods, in accordance with their stacking pattern, are positioned within the profiled bundle in such a way that the profiled chamber to be processed faces upwardly, i.e., in the direction toward the milling cutter head 34, they can be supplied directly to the milling plane 15.

In the case that the profiled chamber faces downwardly, i.e., in the direction of the machine bed, the profiled rods must first be turned by 180 degrees about their longitudinal axis at the feed side by means of the turning device 53 that is also part of the stacking device 18. This indirect feed ensures that these profiled rods can also be supplied in the correct position into the milling plane 15, i.e. with the profiled chamber facing upwardly. The plane E1-E1 is the reference plane for automatic removal from the stack.

Figure 2:
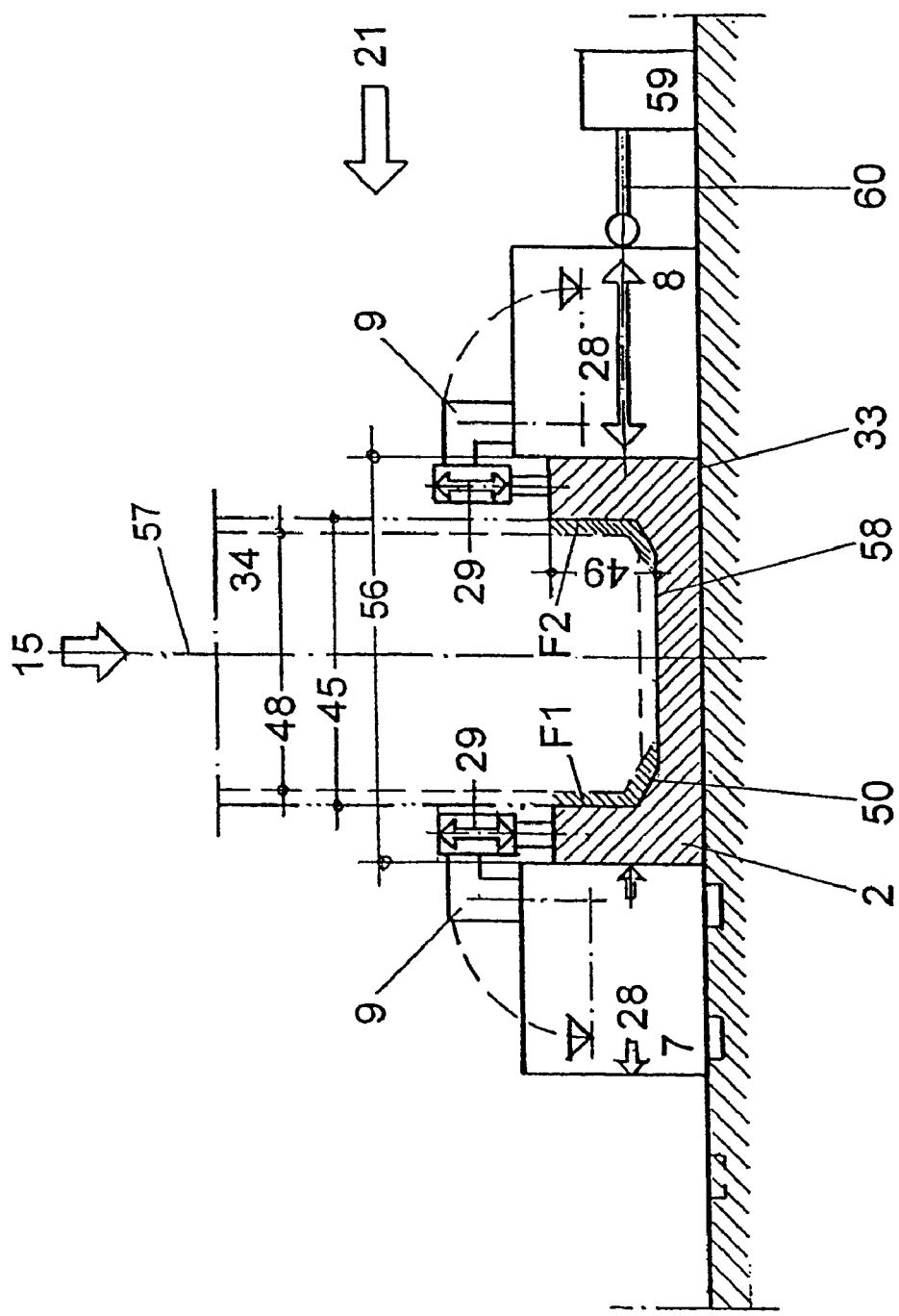
FIG. 2 a clamping and milling cutter head engagement situation in the case of a U-shaped profile with horizontal/vertical clamping elements and distance measuring device for position determination.

FIG. 2 illustrates the profiled rods in the clamping situation in the milling plane 15 exemplified by a profiled rod having a U-shaped cross-section 2. The profiled rod is clamped horizontally by means of clamping elements 7 and 8. Vertical clamping elements 9 have the function of holding-down elements. The fixed profiled section stop 7 and the movable horizontal clamping elements 8 are identified with regard to their horizontal movements by arrows 28. The movement direction of the pivoted vertical clamping elements 9 is illustrated at 29. By means of a coordinated clamping movement between 7, 8, and 9, the profiled rod 2 is fixedly placed in a straight alignment against the plane contact surface 33 of the table area 11.

The width 56 of the profiled cross-section 2 can be determined by the horizontal distance measuring device 59 with measuring sensor 60 because the position of the clamping elements 9, whose size is known, is fixed and clamping element 8 at the time of the measurement rests fixedly against 2. Based on the width 56, the profile center 57 is determined by calculation. This width-related center is however only identical to the center of the profiled chamber width before milling 48 when the two legs of the U-shaped profiled section have the same thickness.

For performing the milling operation in the dimensional area of the chamber of the profiled section, the milling cutter head 34, whose predetermined effective milling width corresponds to the desired profiled chamber width 45 after milling, is positioned at the profile center 57 and is thus lowered into the profiled chamber until the desired profiled chamber depth 49 results. The difference between the profiled chamber width 48 before milling and the profiled chamber width 45 after milling corresponds to the areas F1, F2 to be removed by cutting as illustrated by means of the example of a U-shaped profiled section. The milling cutter head 34 is additionally provided with a follower device 25 (FIG. 1) for deburring and post-shaping.

Figure 3:
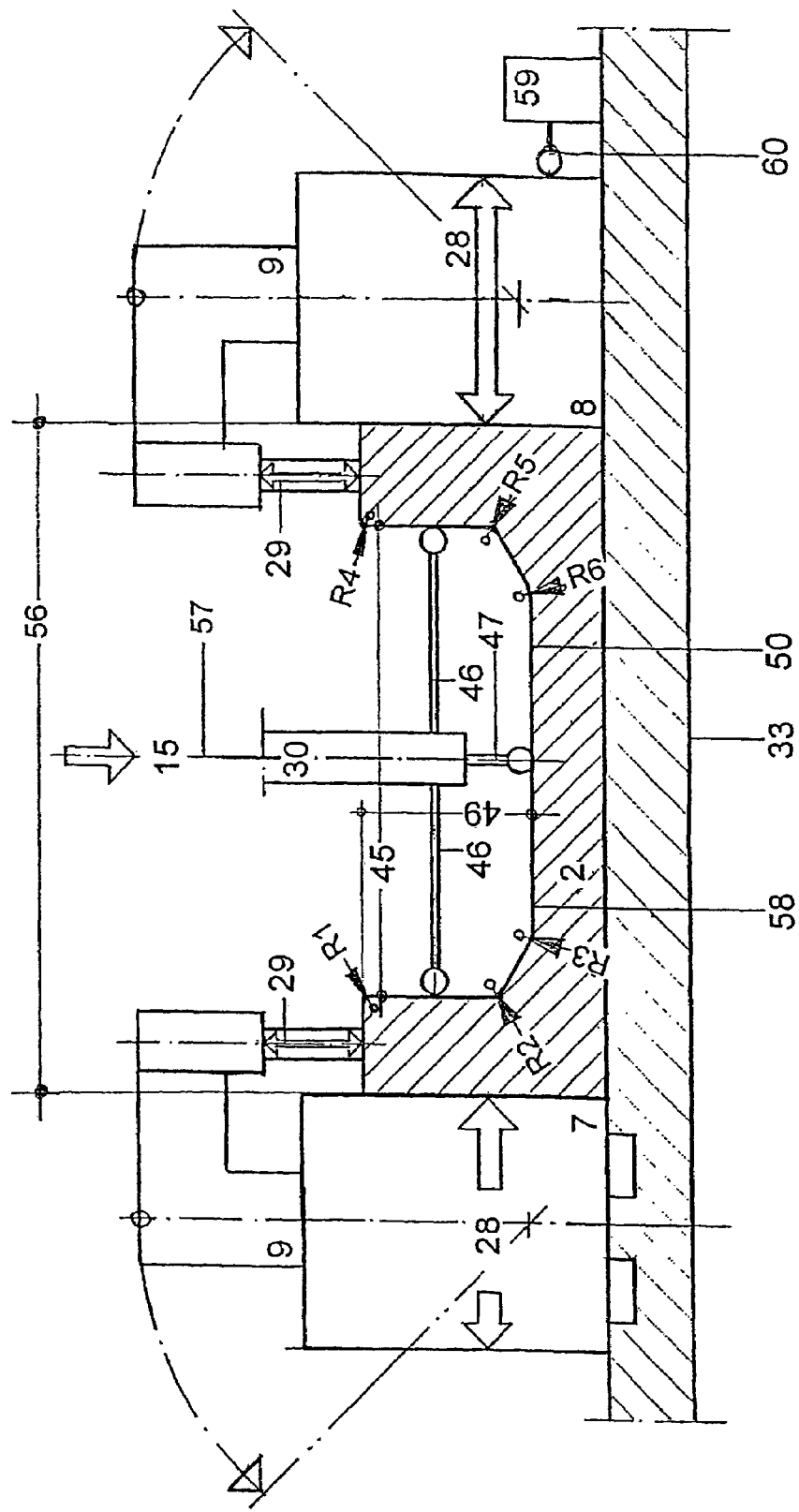
FIG. 3 a clamping and profiled chamber measuring situation of a U-shaped profiled section with horizontal/vertical clamping elements and measuring sensor.

By means of the measuring sensor 30 illustrated in FIG. 3 that is immersed into the U-shaped profiled chamber, the profiled center 57 can be measured directly. For the same leg thickness, the profiled center is identical with the calculated profiled center. The measuring sensor 30 enables moreover the detection of the entire profiled chamber contour 50, 58, illustrated by the curved lines R1 to R6.

This contour detection function can be utilized in the technical embodiment of the optoelectronic measuring sensor also for the purpose of monitoring continuously the milling result with regard to size in order to be able to respond in a timely fashion to signs of wear of the carbide cutting plates of the milling cutter head.

Figure 4:
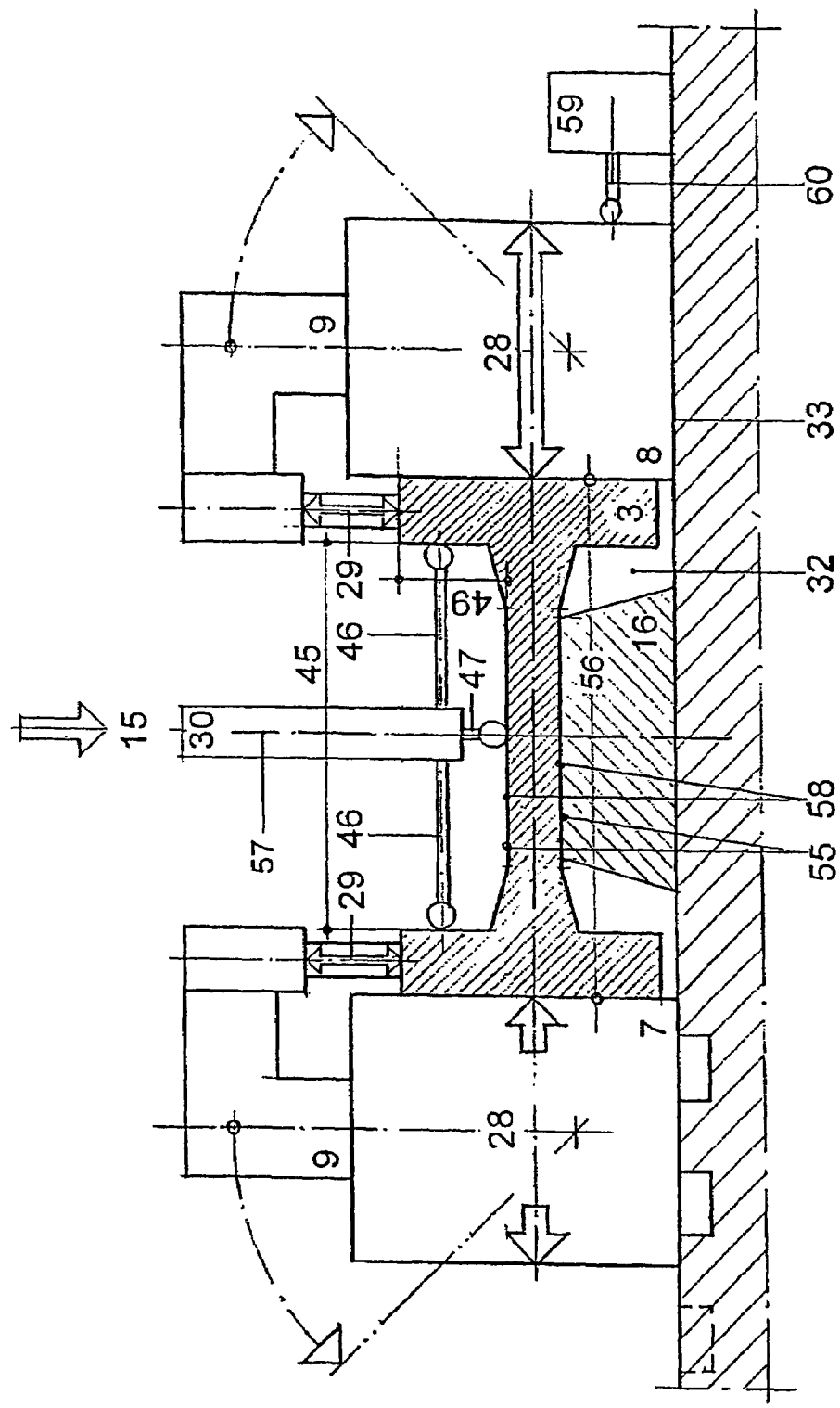
FIG. 4 a clamping and profiled chamber measuring situation of a symmetric H-profiled section with horizontal/vertical clamping elements and measuring sensor.

While the U-shaped profiled sections because of their straight profiled back can be placed with a large surface area against the contact surface 33, the H-shaped profiled sections 3 in the area of the chamber facing away from the milling cutter head 34 must be provided during clamping with a matched profiled support 16 (FIG. 4). The required free clamping space 32 provides for statically determined clamping conditions.

Figure 5:
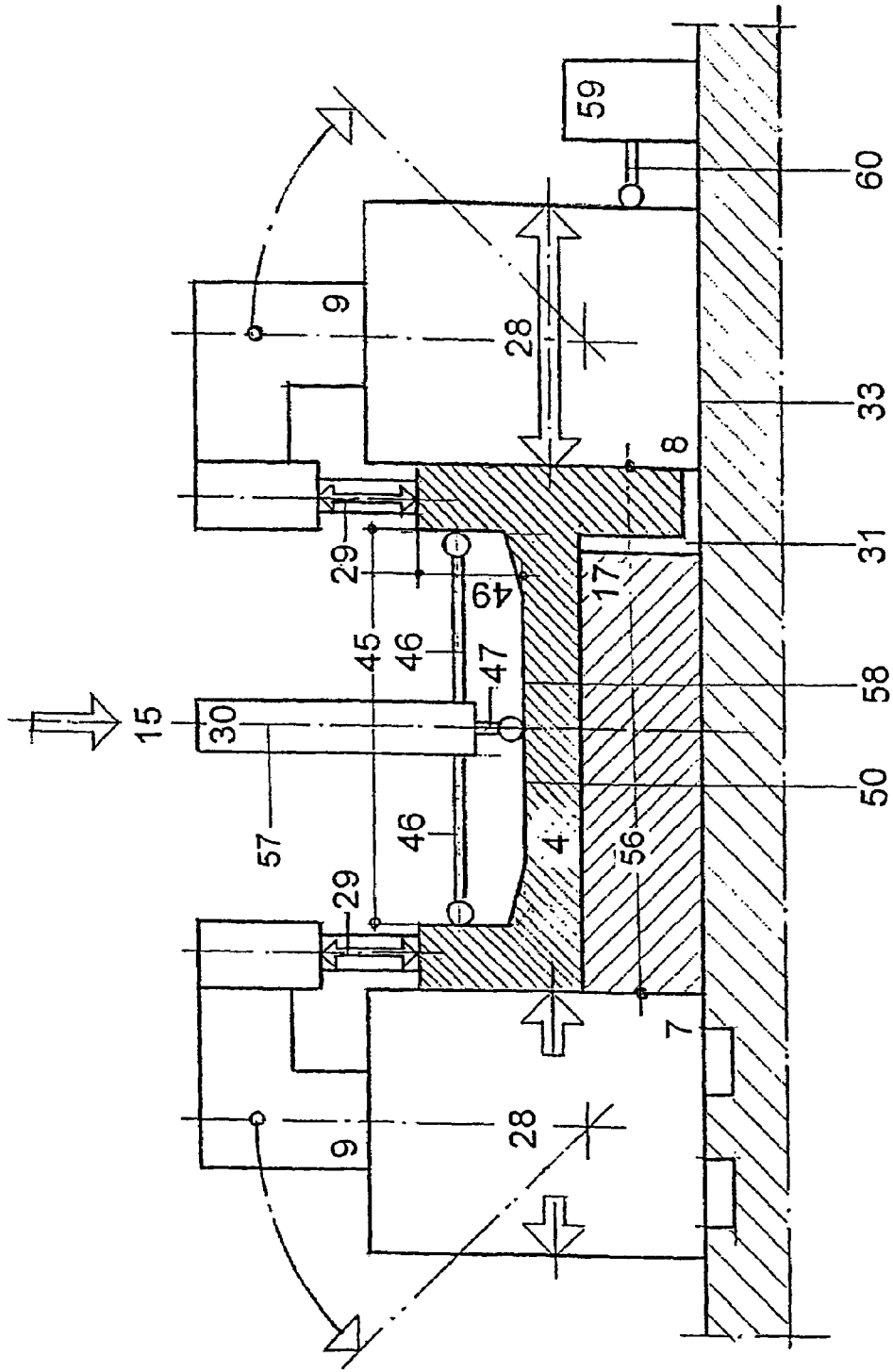
FIG. 5 a clamping and profiled chamber measuring situation of a U-shaped profiled section having a web with horizontal/vertical camping elements and measuring sensor and distance measuring device.

A similar clamping situation is observed also for U-shaped profiled section with web 4 where a correspondingly matched free clamping space 31 is provided (FIG. 5).

Figure 6:
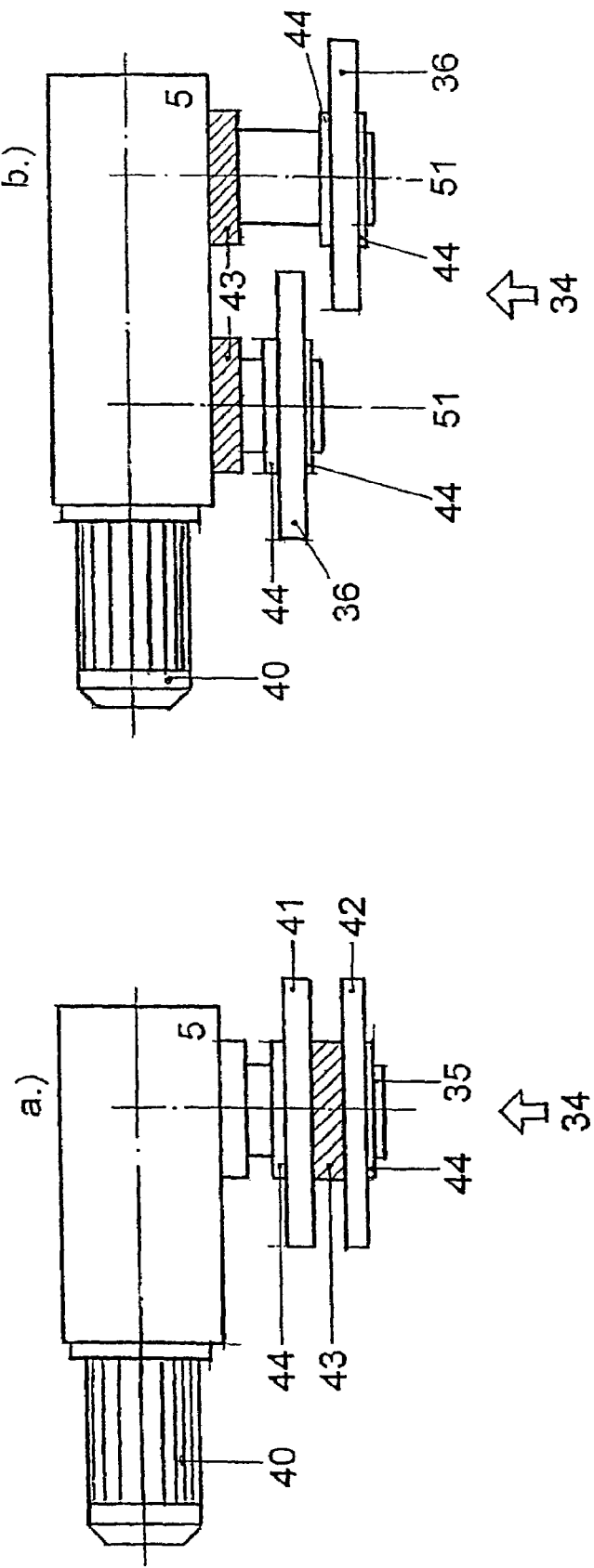
FIG. 6 a basic illustration a) of a two-disk milling cutter head of a milling unit, with a sliding element, b) of a two-disk milling cutter head on two shafts.

With regard to the configuration of the milling unit 5, the variant a) as well as the variant b) according to FIG. 6 can be utilized.

In the case of variant a) the two disk-shaped milling cutters (milling cutter disks) 41 and 42 of the milling cutter head 34 are positioned on a common shaft 35. The fixation elements 44 generate the lateral limitation of the disk-shaped milling cutters 41, 42.

By means of the sliding elements 43 an effective cutting width of the milling cutter head 34 can be adjusted.

The variant b) employs disk-shaped milling cutters (milling cutter disks) 36 arranged adjacent to one another and having their own shafts 51 that are separately driven. The advantage of this configuration is that the effective cutting width of this milling cutter head 34 can be realized more easily by means of the two sliding elements 43 because of the individual advancement.

For ensuring a significantly increased economic performance beyond that of conventional milling, the high-speed milling cutter system is provided with two constructive features that provide the prerequisites for obtaining this goal. The first feature is the use of milling cutter heads 34 with milling cutter disks 36, 41, 42 (see FIG. 6) that have a great diameter >600 mm in order to keep the primary processing time of the actual cutting operation at a minimum by realizing high advancing speeds of approximately 4 to 8 meters per minute. The second feature is the significant reduction of the non-productive processing times that are essentially caused by feeding the profiled rods, by positioning the profiled rods in the milling plane 15, and by removing the profiled rods.

Figure 7:
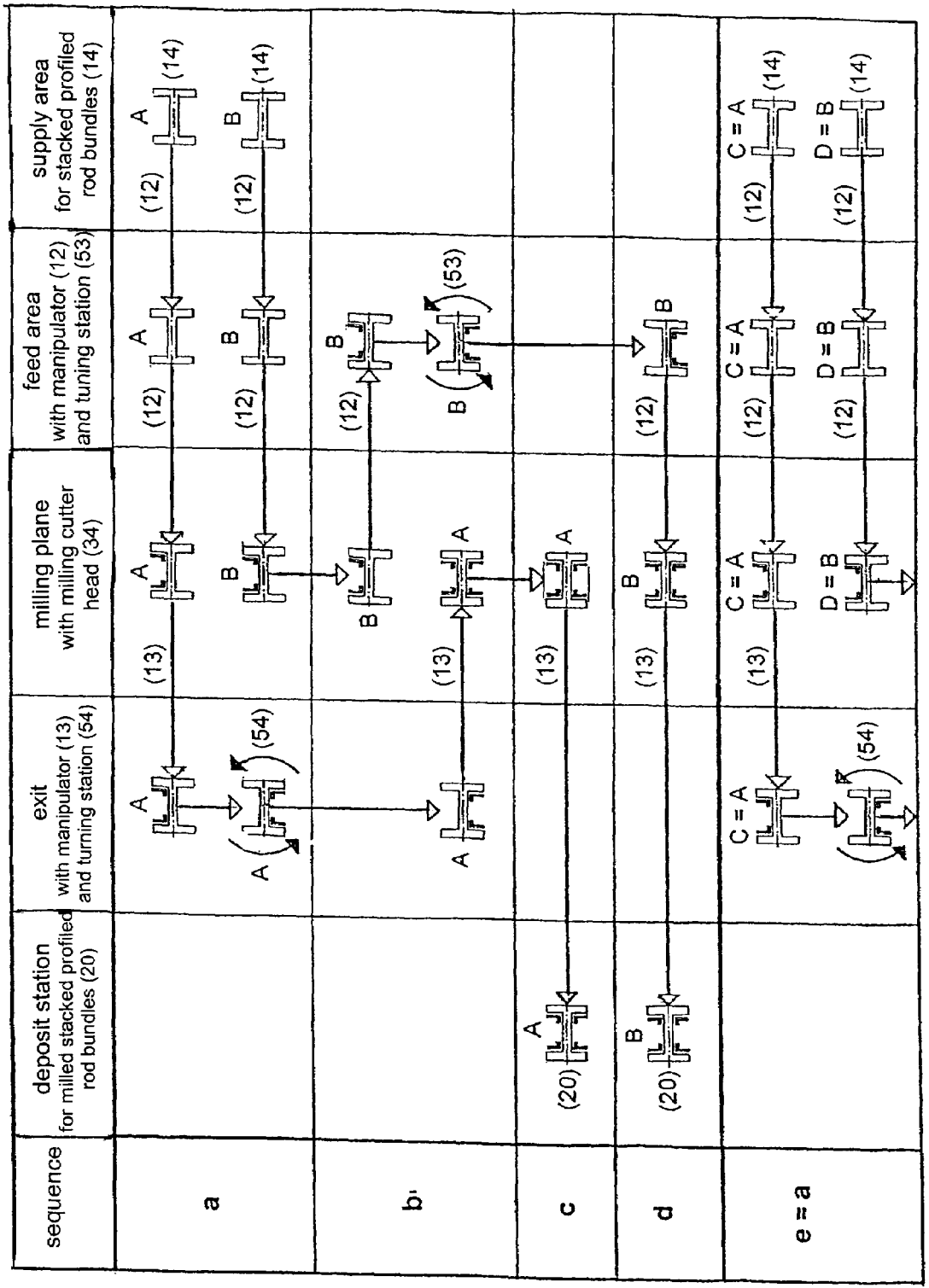
FIG. 7 a schematic illustration of the processing sequences for high-speed milling processing of a symmetric H-shaped profiled section.

The principle of the invention of an integrated stacking device 18 is the solution for minimizing the non-productive processing times. FIG. 7 illustrates the sequence of manipulations exemplified for a symmetric H-shaped profiled section which sequence is characterized by the targeted use of the manipulators 12, 13 and turning stations 53, 54 that operate automatically. The optimization of the non-productive processing time in accordance with the sequence schematic is illustrated simply by the fact that for the sum total of all manipulations that occur a relatively large profiled rod availability in the milling plane 15 can be observed, which is the prerequisite for a milling operation.

For example, sequence a shows that the profiled rod A is transported by manipulator 12 at the feed side from the supply area 14 into the milling plane 15. While the manipulator 13 at the exit side removes the profiled rod after milling of the profiled chamber from the milling plane 15 and transports it to the turning station 54 at the exit side, the manipulator 12 already removes in a simultaneous operation the next profiled rod B from the supply area and moves it in the direction of the milling plane 15. After milling, the profiled rod B is transported by the manipulator 12 to the turning station 53 at the feed side—sequence b—and is turned there by 180 degrees about its longitudinal axis so that now the still unprocessed profiled chamber faces upwardly.

Prior to this, the profiled rod A has been turned by the turning station 54 by 180 degrees and has been transported by manipulator 13 into the milling plane 15 where the milling operation has been carried out in the second chamber of this profiled rod A. The profiled rod A is now finish-machined, and, as shown in sequence c, is transported by manipulator 13 to the deposit station 20 and stacked. The plane E2-E2 is the reference plane for automatic stacking of the finish-machined profile rods.

The profiled rod B completes in sequence d its pass through the system after its second chamber has been milled and after it has been transported by means of manipulator 13 in the direction of the deposit station. With sequence e, identical to a, a new cycle of profiled section processing begins with the profiled sections C=A and D=B.

While in accordance with FIG. 7 the milling operation of symmetric H-shaped profiled section can be performed in an automated fashion with regard to manipulation technology by combining two manipulators 12, 13 and two turning stations 53, 54 with horizontal turning axes 38, 39, this is not easily possible in the case of asymmetric H-shaped profiled sections.

In order to be able to completely mill both chambers K1 and K2 of this type of profiled section in a single pass through the high-speed milling cutter system, in a further embodiment of the principle of the invention it is proposed to provide the turning stations 53, 54 with vertical turning axes 27 in addition to their horizontal turning axes 38, 39 so as to enable turning of the profiled rods about the vertical axes 27 in an engineering-technological free space.

Figure 8:
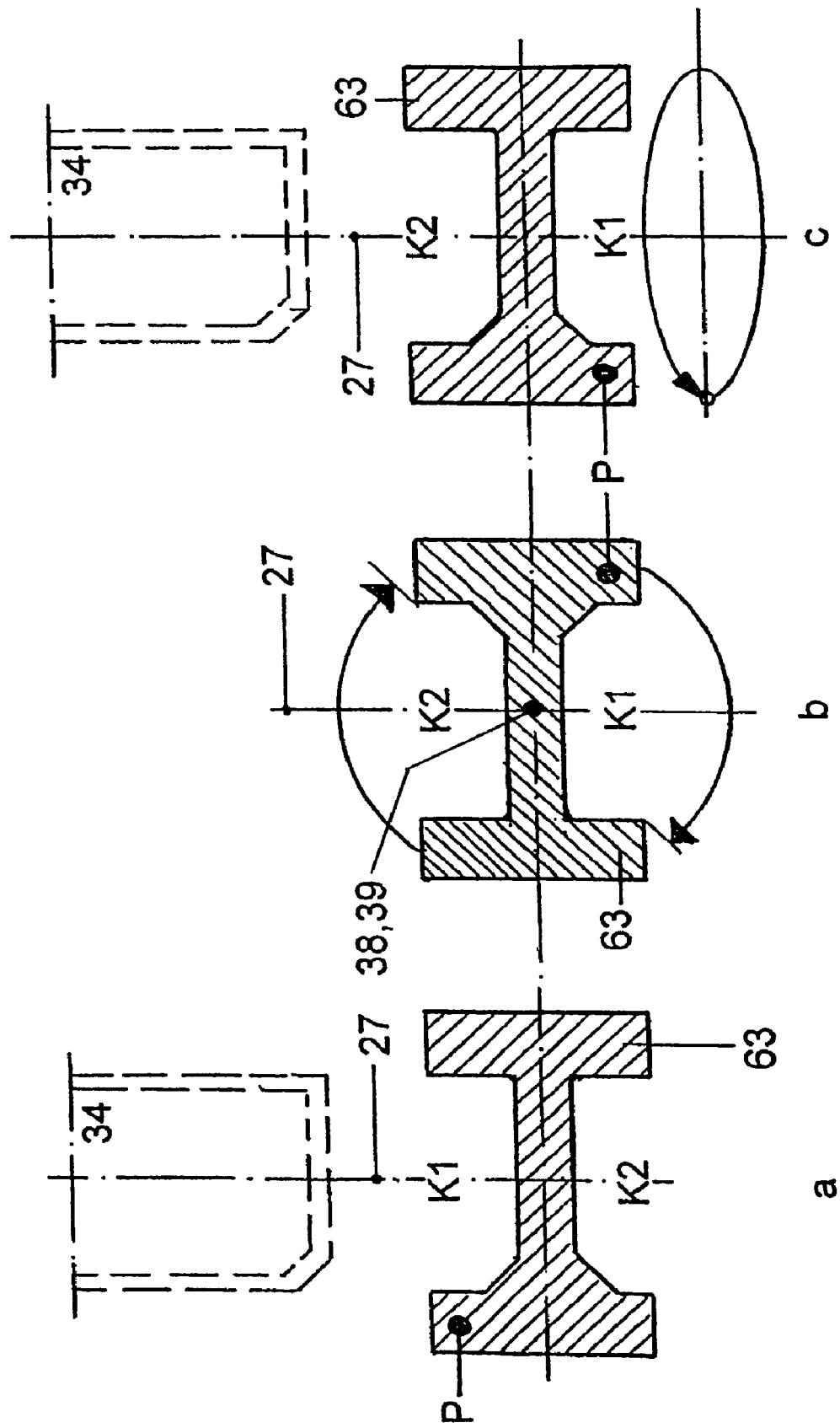
FIG. 8 a schematic illustration of a manipulation sequence of an asymmetric H-shaped profiled section.

In FIG. 8 a the initial position of the asymmetric H-shaped profiled cross-section 63 is illustrated. The profile flange that is connected by slanted portions with the web is identified by the geometric reference point P; the second flange having a rounded transition has no marking. The profiled chamber K1 faces upwardly in the direction toward the milling cutter head 34. When the profiled cross-section is turned by 180 degrees about its horizontal longitudinal axis—axis 38, 39—the situation according to b results. The profiled chamber K2 faces upwardly in the direction toward the milling cutter head 34 but the flange positions of the profiled cross-section 63 are reversed so that no milling operation is possible. Only once the profiled rod has been turned additionally about 180 degrees about its vertical axis 27—illustration c—it can assume the position that, as a result of the geometric matching, enables a milling operation of the second chamber K2: The chamber K2 is no facing in the direction toward the milling cutter head 34 and the slanted transitions and rounded transitions are located at the proper side of the profiled cross-section 63.

Figure 9:
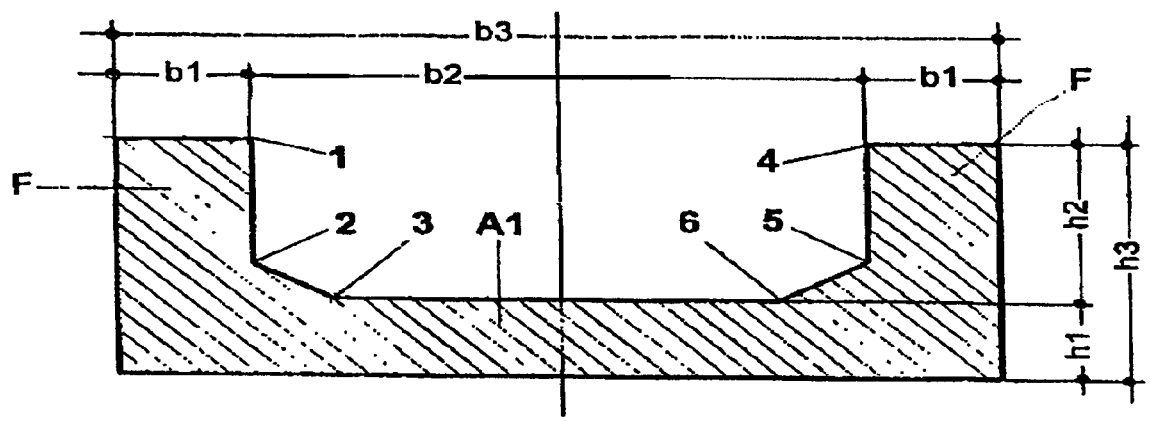
FIG. 9 a profiled cross-section of a metallic guide element according to the prior art.

In accordance with the prior art, the main quantity of the profiled rods provided for forklift construction are supplied as a rolled profiled section. Such a rolled profiled section is illustrated in FIG. 9 in an exemplary fashion in cross-section.

In the U-shape profiled section determined by the external dimensions b3 and h3 with the surface A1, the flanges F having the dimensions b1/h2 and the web thickness h1, there is a dimensional area b2/h2 of a chamber acting as a functional area and defined by curved lines between the points 1, 2, and 3 as well as 4, 5, and 6. Here, the rolls for translatory movements of linear guide elements are positioned in such a way that they engage the open dimensional area b2/h2 of the chamber between the two profiled flanges F with the dimensions b1/h1.

By means of modern hot rolling and straightening devices, dimensional tolerances of the chamber of 1.0 mm down to 0.8 mm can be adjusted in a reproducible way. For the type of forklifts with great lifting travel, for example in the range of 5 m to 14 m, used primarily in warehouse technology, the dimensional tolerances of the chamber that can be achieved by hot rolling alone are too coarse because the slant of the completely extended mast system must be kept within limits so that the center of gravity of the vehicle is not negatively affected.

With regard to manufacturing technology this problem is solved in that hot rolling is followed by a cold drawing operation.

By cold drawing, the dimensional tolerances of the chamber of 0.4 mm can be realized reproducibly; this corresponds to cutting in half the tolerance range that can be achieved by rolling technology.

A further reduction of the dimensional tolerances of the chamber to values of less than 0.4 mm cannot be realized in a reliable way by cold drawing.

This is so because:

By cold drawing not only the targeted desired cross-sectional reduction of A1 is achieved but one must accept, because of process-caused material flows, that the profiled rods become more or less curved so that they require a subsequent straightening operation in order to make them usable.

This straightening operation for minimizing deviations from straightness and distortion inevitably effects also the tolerances of the chamber dimension b2 because the U-shaped or H-shaped profiled sections of the lifting mast construction are so-called "open" profiled sections. The proposed method combines the partial step of hot forming of a blank that is matched in a targeted way, as illustrated in FIGS. 10 and 11, with the step of locally machining by cutting this blank in the dimensional area of the chamber, carried out by means of the aforementioned high-speed milling cutter system.

Figure 10:
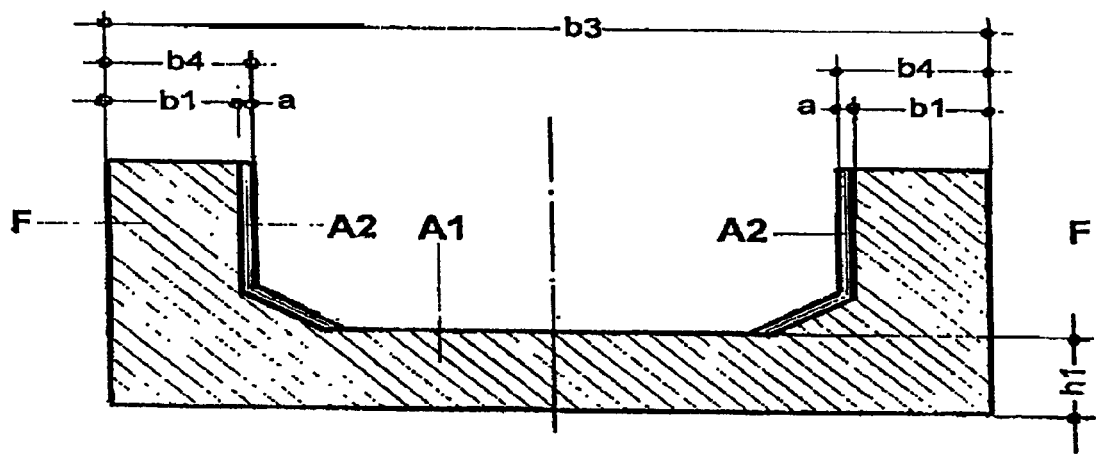
FIG. 10 a hot-formed profiled cross-section according to a first embodiment of the invention.
Figure 11:
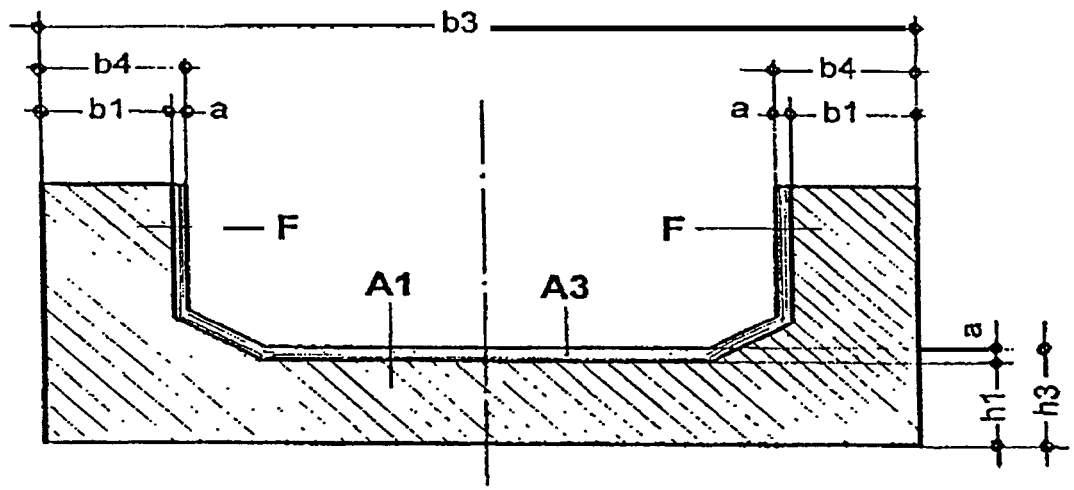
FIG. 11 a hot-formed profiled cross-section according to a second embodiment of the invention.
Figure 12:
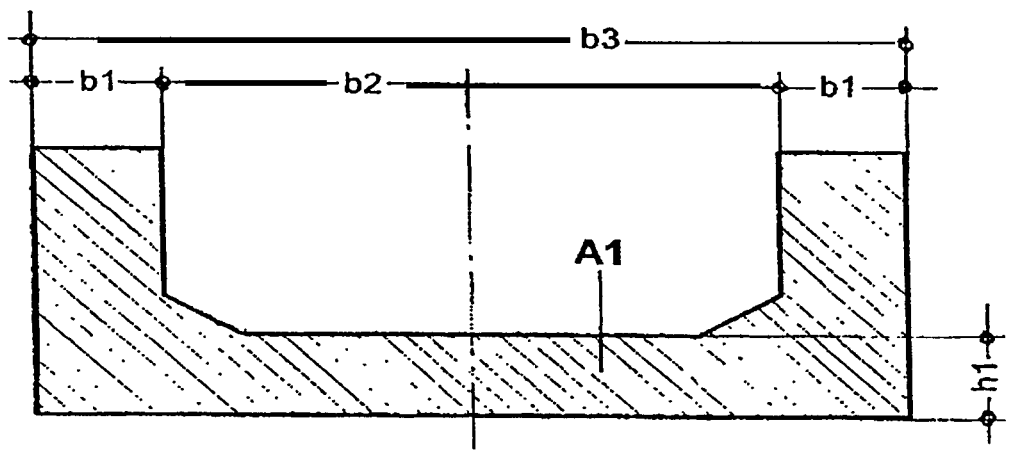
FIG. 12 a hot-formed profiled cross-section made from a profiled section blank according to FIG. 9 or 10, shown after mechanical processing.

In this connection, the matched blank according to FIG. 10 or FIG. 11 and the final partially mechanically processed finished profiled section according to FIG. 12 are matched to one another in such a way that the final profiled section according to FIG. 12 and the hot rolled mass-produced profiled section according to the prior art according to FIG. 9 substantially have the same section modulus and comparable dimensions.

In this way, it is ensured that profiled sections produced in accordance with the method of the present invention can be installed in existing lifting mast constructions without expensive and time-consuming changes.

The profiled section produced in accordance with the present method has in comparison to the drawn profiled sections of the prior art the following advantages:

a) Reduced Dimensional Tolerances of the Chamber of 0.2 mm

The reliably obtainable tolerance of 0.2 mm of the chamber dimension b2 that represents cutting in half the tolerances of the drawn profiled section, makes it possible that, in addition to reduced play, also stocking of lifting mast rolls of 3 or 2 rolls per profiled section can be reduced to a single roll. In addition to eliminating sorting expenditure for the lifting mast construction, it is also possible to save significantly on inventory costs.

b) Profiled Section Running Surfaces Free of Decarburization

For producing the drawn profiled section a hot-rolled or extruded profiled blank is used that in general has process-caused decarburization depths of 0.3 mm to 0.5 mm. The decarburized cannot be removed by cold drawing. In the case of unalloyed or low-alloyed construction steel used for lifting mast profiled sections, carbide is the essential element for hardness and strength. Therefore, decarburized profiled sections exhibit a drop in hardness in their surface areas.

This holds true also for greatly loaded running surface areas of the profiled section, schematically illustrated in FIG. 9 by the curved lines between points 1, 2 and 3 as well as 4, 5, 6.

A decarburized running surface area is more prone to wear under the effect of the pressure forces exerted by the rolls and has a reduced permissible Hertzian stress than areas of the profiled section that are not decarburized.

In the case of the matched profiled blank with the flanges F in accordance with the method of the present invention, as shown in FIG. 10, material a has been "laid" onto the running surface areas, corresponding to the two surfaces A2, onto the flanges F, having the dimensions b1+a=b4, and up to the flange height h2. In a second embodiment according to FIG. 11, the profiled blank is provided in the dimensional area of the chamber continuously with material with the dimensions b1+a=b4 and at the stay h1+a=h3, as illustrated by surface A3 in FIG. 11. This variant has the advantage that a third strongly loadable running surface area, schematically illustrated in FIG. 9, is provided by the curved line between the points 3 and 6.

The added material h1+a=h3 with the surface A3 in FIG. 11 is sized sufficiently large such that the decarburization of the rolled profiled section is removed reliably by the machining step of cutting.

This is true also in the case that the cutting removal must be done asymmetrically in order to equalize thickness deviations caused by the hot forming process in the flanges F, with b1+a=b4, in FIG. 10 and FIG. 11.

c) Reduction of the Machining Expenditure in Comparison to the Drawn Profiled Section By means of machining by cutting that is limited to the running surfaces according to the curved lines 1, 2, 3 and 4, 5, 6 in the dimensional area b2/h2 of the chamber, the method according to the invention is optimized with regard to value analysis. Because of the nature of the employed method, in the case of cold drawing the entire profile circumference must be machined, even those areas whose machining does not generate a product utility. An auxiliary effect of the machining process by cutting of the profiled running surface is that the manual grinding removal of possibly occurring surface flaws, which is obligatory before the drawing process, is no longer required. While the drawn profiled section requires several working stages, the method according to the invention requires only a single processing stage.

d) Possibility for Effective Surface Hardening of the Guide Elements

With a further device that is to be arranged downstream of the manufacturing process of machining by cutting of the profiled surfaces, by means of surface hardening of the running surfaces the wear of the guiding elements can be very significantly reduced. The surface hardening treatment based on the mechanism of martensite formation produces the highest possible hardness generation and thus minimal surface wear only when, after removal of the decarburized surface areas, the higher carbide contents of the base material can become fully effective in accordance with the hardening technology.

What is claimed is:

1. A method for producing from profiled blanks metallic guide elements having a functional area, the method comprising the steps of:

hot forming profiled blanks;

subsequently milling in a high-speed milling cutter system the profiled blanks by a position-controlled milling cutter head with milling disks of a great diameter of at least 600 mm, wherein in the step of hot forming, the profiled blanks are matched with regard to a cross-sectional mass distribution of the profiled blanks, respectively, to the subsequent step of milling such that by a partial cutting removal of the profiled blanks, the functional area of the guide elements to be produced are produced with narrow dimensional tolerances;

controlling autonomously a material flow of the profiled blanks within the high-speed milling cutter system by an integrated stacking device comprised of a first manipulator and a second manipulator and turning stations, wherein a first one of the turning stations is arranged at a feed side of the milling cutter head and a second one of the turning stations is arranged at an exit side of the milling cutter head, wherein the first manipulator is arranged at the feed side and supplies the profiled blanks in a first direction to the milling cutter head for a first milling step, and wherein the second manipulator is arranged at the exit side and transports the profiled blanks after the first milling step from the milling cutter head in the first direction to the second turning station, and transports the profiled blanks from the second turning station in a second direction opposite to the first direction to the milling cutter head for a second milling step, wherein the first manipulator transports the profiled blanks after the first milling step in a second direction opposite to the first direction to the first turning station when the second manipulator is busy transporting.

2. The method according to claim 1, further comprising the steps of:

supplying the profiled blanks to be milled to the high-speed milling system in the form of stacked profiled rod bundles;

removing by the first manipulator at the feed side of the high-speed milling cutter system a long profiled rod or simultaneously plural short profiled rods from the stacked profiled rod bundle, respectively; and transporting the long profiled rod or the plural short profiled rods in a direction toward a milling plane of the high-speed milling cutter.

3. The method according to claim 1, wherein a required turning movement of the profiled blanks about at least one of a horizontal axis and a vertical axis for obtaining a correct milling position in a milling plane of the high-speed milling cutter system is done automatically by the first and second turning stations at the feed side and at the exit side of the high-speed milling cutter system.

4. The method according to claim 1, wherein a finish-milled profiled blank is stacked with sensor support to a profiled rod bundle by the second manipulator at the exit side of the high-speed milling cutter system in a deposit area.

5. The method according to claim 1, wherein all steps of manipulating, turning and stacking the profiled blanks in the integrated stacking device are program-controlled and performed automatically.

6. The method according to claim 1, wherein, in addition to the step of controlling autonomously the material flow, an operation of the high-speed milling cutter system is possible by supplying individual profiled blanks to a supply plane.

7. The method according to claim 1, further comprising the step of clamping the profiled blanks, supplied by the manipulators to a milling plane of the high-speed milling cutter system, by horizontal and vertical clamping elements in a stationary position that is proper for milling, and detecting an actual contour-based position of the profiled blanks resulting from the step of clamping by a horizontal distance measuring device and a measuring sensor.

8. The method according to claim 1, wherein a the measured actual contour-based position of the profiled blanks is used for advancing the milling cutter head such that a horizontal and vertical cutting removal generated by the milling operation produces desired actual dimensions in areas of the profiled blanks that become the functional area of the guide elements.

9. The method according to claim 1, wherein the step of milling is done in a single milling pass.

10. A high-speed milling cutter system, said high-speed milling cutter system comprising a position-controlled milling cutter head with milling disks of a great diameter of at least 600 mm and further comprising a stacking device comprised of a first manipulator and a second manipulator and turning stations, for producing metallic guide elements having a functional area by milling hot-formed profiled blanks in said high-speed milling cutter system by said position-controlled milling cutter head with said milling disks of said great diameter, wherein the hot-formed profiled blanks are matched with regard to a cross-sectional mass distribution of the profiled blanks, respectively, to the subsequent milling step such that by a partial cutting removal of the profiled blanks the functional area of the guide elements to be produced are produced with narrow dimensional tolerances, and by controlling autonomously a material flow of the profiled blanks within said high-speed milling cutter system by said stacking device comprised of said first manipulator and said second manipulator and said turning stations;

wherein a first one of said turning stations is arranged at a feed side of said milling cutter head and a second one of said turning stations is arranged at an exit side of said milling cutter head;

wherein said first manipulator is arranged at said feed side and supplies the profiled blanks in a first direction to said milling cutter head for a first milling step;

wherein said second manipulator is arranged at said exit side and transports the profiled blanks after said first milling step from said milling cutter head in said first direction to said second turning station;

wherein said second manipulator transports the profiled blanks from said second turning station in a second direction opposite to said first direction to said milling cutter head for a second milling step;

wherein said first manipulator transports the profiled blanks after said first milling step in a second direction opposite to said first direction to said first turning station when said second manipulator is busy transporting.

11. The high-speed milling cutter system according to claim 10, wherein the milling cutter head is provided with a follower device for deburring and post-shaping.

12. The high-speed milling cutter system according to claim 10, wherein the milling disks of the milling cutter head are disk-shaped milling cutters that are adjustable relative to one another.

13. The high-speed milling cutter system according to claim 12, wherein the disk-shaped milling cutters are positioned on a common drive shaft or on separate drive shafts.

* * * * *